United States Patent
Woytowitz

(10) Patent No.: US 7,245,991 B1
(45) Date of Patent: Jul. 17, 2007

(54) DISTRIBUTED ARCHITECTURE IRRIGATION CONTROLLER

(75) Inventor: Peter J. Woytowitz, San Diego, CA (US)

(73) Assignee: Hunter Industries, Inc., San Marcos, CA (US)

( * ) Notice: Subject to any disclaimer, the term of this patent is extended or adjusted under 35 U.S.C. 154(b) by 0 days.

(21) Appl. No.: 11/045,527

(22) Filed: Jan. 28, 2005

(51) Int. Cl.
*G05D 7/00* (2006.01)

(52) U.S. Cl. ............................ 700/284; 700/19; 239/69
(58) Field of Classification Search ................ 700/283, 700/284, 17, 18, 19, 282; 239/69
See application file for complete search history.

(56) References Cited

U.S. PATENT DOCUMENTS

| | | | |
|---|---|---|---|
| 5,097,861 A | 3/1992 | Hopkins et al. ............ 137/78.3 |
| 5,262,936 A | 11/1993 | Faris et al. ................. 364/140 |
| 5,287,888 A | 2/1994 | Geiger ..................... 137/624.2 |
| 5,444,611 A | 8/1995 | Woytowitz et al. ......... 364/145 |
| 5,602,728 A | 2/1997 | Madden et al. ............. 364/145 |
| 5,748,466 A | 5/1998 | McGivern et al. .......... 364/148 |
| 5,921,280 A | 7/1999 | Ericksen et al. ........ 137/624.11 |
| 5,956,248 A | 9/1999 | Williams et al. .............. 700/16 |
| 6,112,157 A * | 8/2000 | Boon et al. .................... 702/58 |
| 6,240,336 B1 * | 5/2001 | Brundisini ................... 700/284 |
| 6,459,959 B1 * | 10/2002 | Williams et al. ............ 700/284 |
| 6,600,971 B1 * | 7/2003 | Smith et al. ................. 700/284 |
| 6,685,104 B1 * | 2/2004 | Float et al. .................... 239/69 |
| 6,708,084 B2 * | 3/2004 | Battistutto et al. .......... 700/284 |
| 6,721,630 B1 | 4/2004 | Woytowitz ................... 700/284 |
| 6,766,221 B1 | 7/2004 | Christiansen ................ 700/284 |
| 6,772,050 B2 * | 8/2004 | Williams et al. ............ 700/284 |
| 6,842,667 B2 | 1/2005 | Beutler et al. .............. 700/284 |
| 6,898,467 B1 | 5/2005 | Smith et al. ................... 700/20 |
| 2002/0091452 A1 | 7/2002 | Addlink et al. ................ 700/19 |
| 2005/0038529 A1 | 2/2005 | Perez et al. ................... 700/19 |
| 2005/0267641 A1 * | 12/2005 | Nickerson et al. .......... 700/284 |
| 2005/0273205 A1 | 12/2005 | Nickerson et al. .......... 700/284 |

OTHER PUBLICATIONS

Motorola, Irrinet CPU Module, 15 pages, 1992.
Motorola, MIR5000C Central System, 13 pages, 1991.
Motorola, Irrinet, I/O Module, 4 Digit Inputs/16 Solid-State Outputs, 23 pages, 1992.
Rain Bird, Maxicom Central Control System, Guide to Operations, Table of Contents and pp. 5.4-1-2; 5.4-41-42; 7.2-1-2; 1993.
Motorola, MIR5000 System Features, 20 pages, 1991.

* cited by examiner

*Primary Examiner*—Leo Picard
*Assistant Examiner*—Charles Kasenge
(74) *Attorney, Agent, or Firm*—Michael H. Jester

(57) ABSTRACT

A processor is connected by a bus to a plurality of station modules, each station module being connected to a corresponding valve and having a micro-controller. The processor executes a stored watering program and controls the station modules in accordance with the program. Messages are bi-directionally sent and received over the bus that are generated by the processor and the micro-controllers. Each message contains an identification field with an instruction that describes a meaning of the message. The processor and the micro-controllers each interpret the messages received thereby and perform predetermined functions in response thereto.

19 Claims, 8 Drawing Sheets

DISTRIBUTED ARCHITECTURE IRRIGATION CONTROLLER

FIELD OF THE INVENTION

The present invention relates to electronic controllers that control valves which supply water to sprinklers that irrigate turf and landscaping.

BACKGROUND OF THE INVENTION

In many parts of the world due to inadequate rainfall it is necessary at certain times during the year to artificially water turf and landscaping. An ideal irrigation system for turf and landscaping should utilize a minimum number of valves, supply lines and sprinklers. Preferably the valves should be turned ON and OFF by an inexpensive, yet reliable electronic irrigation controller that is easy to program and can carry out a wide variety of watering schedules. The goal is to uniformly distribute the optimum amount of water over a given area. The type, placement and flow rates for each of the sprinklers are pre-selected when an irrigation system is designed and/or installed. The optimum flow rate provided by each sprinkler should preferably fall within plus or minus one-quarter gallon-per minute (GPM). The amount of water supplied by each sprinkler is largely determined by the size and configuration of its nozzle orifice(s), although variations result from fluctuations in water pressure that cannot be fully negated with regulators.

Residential and commercial irrigation systems typically include one or more solenoid operated valves that are turned ON and OFF by an electronic irrigation controller. The valves admit water to various subterranean branch lines usually made of PVC pipe that typically have several sprinklers connected to risers coupled to the branch lines at spaced intervals. Each combination of a solenoid valve and its associated sprinklers is referred to in the irrigation industry as a station or zone.

A modern electronic irrigation controller typically includes a microprocessor that executes one or more watering programs. The watering programs can be pre-programmed by the user via push button and/or rotary controls. The controller usually has an LCD or other display to facilitate programming by the user. Often the controller will revert to a default watering program in the case of a power failure. The microprocessor controls the solenoid valves via suitable drivers and switching devices. The valves are opened and closed by the microprocessor in accordance with the pre-programmed run and cycle times for each of the stations.

Over the past decade, modular expandable irrigation controllers have gained increasing popularity. In these controllers, the base portion of the system contains the microprocessor and user actuated controls. Each station is then controlled by a corresponding station module which typically comprises a plastic housing that encloses and supports a station module circuit, as well as wire connection terminals for connecting wires to a plurality of solenoid actuated valves. Usually each station module circuit includes a plurality of triacs or other AC switching devices and can independently control a plurality of solenoid actuated valves, i.e., stations. The station modules contain pins, sockets, card edge connectors or some other standard form of connectors for allowing them to be inserted into slots or receptacles in either the housing that contains the microprocessor or a separate back panel hinged to the microprocessor housing. When the station modules are plugged into a modular expandable irrigation controller they are mechanically supported and an electrical connection is made between the microprocessor and the driver. See for example, U.S. Pat. No. 6,721,630 B1 of Peter J. Woytowitz, assigned to Hunter Industries, Inc., the assignee of the present application.

The advantage of an irrigation controller with a modular expandable configuration is that the controller need only be equipped with the minimum number of station modules that can control the total number of stations needed. Thus, for example, an irrigation system may have only three zones, requiring only a single station module, while another may have twelve stations which might require four station modules. Considerable cost savings are thus achieved. Moreover, if an irrigation system expands after initial installation because the landscaping has increased, additional station modules can be plugged into the controller. The station modules can also be removed and replaced if damaged, for example, during a lightening strike. In some modular expandable irrigation systems the base unit is capable of controlling a minimal number of stations without requiring the addition of any station modules. In others, such as the ICC™ irrigation controller manufactured and sold by Hunter Industries, Inc., at least a power module and one irrigation station module must be plugged into the controller in order to operate any stations or zones.

Various manufacturers commercially produce modular expandable irrigation controllers. While the input controls and processor circuitry in these products vary in terms of their functional capabilities, the station modules do not. Conventional station modules include some kind of AC switch such as a triac, along with a circuit that can interpret commands from a microprocessor and drive the AC switch to the appropriate state. Some conventional station modules also include surge suppression components such as metal oxide varistors, gas tubes or inductors.

In conventional modular expandable irrigation controllers the division of tasks between the microprocessor and the station modules is consistent. The microprocessor handles user interface and schedules the irrigation. At the start time, the microprocessor sends a command to the appropriate station module instructing it to turn ON a particular station. Each station module receives and interprets commands and energizes or de-energizes the appropriate station output terminal. The microprocessor is burdened with monitoring currents for fault conditions, counting down the appropriate run time, and issuing the station OFF command when the run time has elapsed. In order for tasks such as current monitoring to be performed properly, the current flowing out of each station should be monitored as well as the total current. The total current must not exceed the rating of the transformer in the irrigation controller, and the current flowing out of each station module must not exceed the rating of the triacs. Where a modular expandable irrigation controller is capable of turning ON many stations simultaneously, the hardware and firmware capabilities of the microprocessor can be exceeded. The microprocessor then resorts to measuring only total current and/or limiting the number of stations that can be ON simultaneously.

Some conventional modular expandable irrigation controllers also provide multiple sensor interface, network communications, and flow sensing capabilities. The microprocessor in such systems can quickly become overloaded. This in turn limits the functionality of one or more of the tasks performed by the irrigation controller and limits the future addition of new functional features.

SUMMARY OF THE INVENTION

In accordance with the present invention a distributed architecture irrigation controller has a plurality of manually actuable controls for entry or selection of a watering program and a memory for storing the watering program. A plurality of station modules are each configured for insertion into one of a plurality of receptacles and are connectable to a corresponding solenoid actuated valve. Each station module includes a micro-controller and at least one switching device for selectively providing a power signal that energizes the corresponding solenoid actuated valve. A processor executes the stored watering program and controls the station modules in accordance with the stored watering program. A bus connects the processor and the receptacles. The processor and the micro-controllers are both capable of sending and receiving messages over the bus that are generated by the processor and the micro-controllers.

The present invention also provides a method of controlling a plurality of valves in an irrigation system. A processor is connected by a bus to a plurality of station modules, each station module being connected to a corresponding one of the valves and having a micro-controller. The processor executes a stored watering program and controls the station modules in accordance with the program. Messages are bi-directionally sent and received over the bus that are generated by the processor and the micro-controllers. Each message contains an identification field with an instruction that describes a meaning of the message. The processor and the micro-controllers each interpret the messages received thereby and perform predetermined functions in response thereto.

DESCRIPTION OF THE PREFERRED EMBODIMENT

The entire disclosures of U.S. Pat. No. 6,721,630 B1 granted Apr. 13, 2004 to Peter J. Woytowitz entitled EXPANDABLE IRRIGATION CONTROLLER WITH OPTIONAL HIGH-DENSITY STATION MODULE, pending U.S. patent application Ser. No. 10/848,394 filed May 17, 2004 also in the name of Peter J. Woytowitz entitled ISOLATED MODULAR EXPANDABLE IRRIGATION CONTROLLER, pending U.S. patent application Ser. No. 10/883,283 filed Jun. 30, 2004 also in the name of Peter J. Woytowitz entitled HYBRID MODULAR/DECODER IRRIGATION CONTROLLER, and pending U.S. patent application Ser. No. 10/985,425 filed Nov. 9, 2004 also in the name of LaMonte D. Porter entitled EVAPOTRANSPIRATION UNIT CONNECTABLE TO AN IRRIGATION CONTROLLER, are hereby incorporated by reference. The aforementioned patent and applications are all assigned to Hunter Industries, Inc., the assignee of the subject application.

Figure 1:
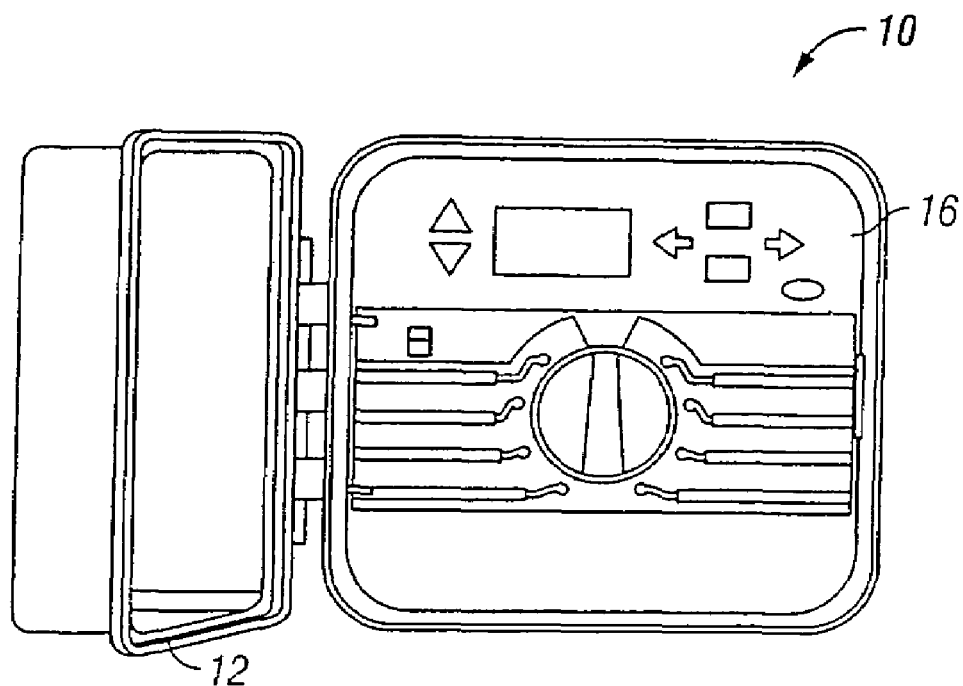
FIG. 1 illustrates an embodiment of the irrigation controller of the present invention in smaller than actual size with its front door open to reveal its removable face pack.
Figure 2:
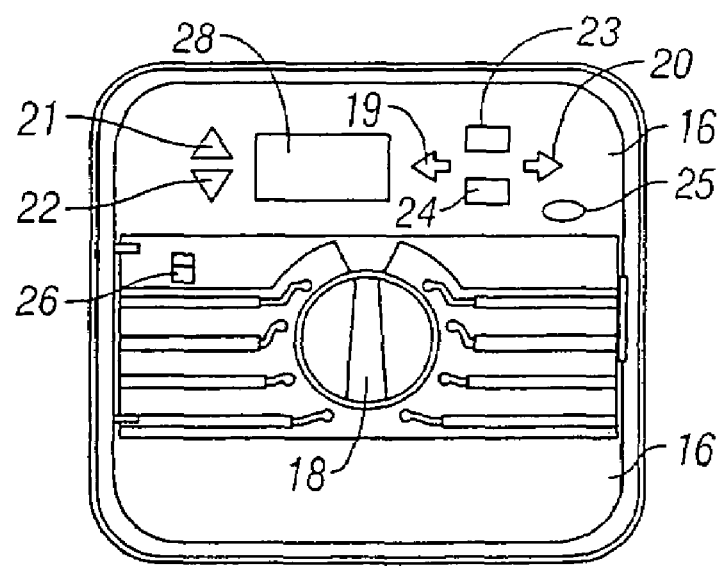
FIG. 2 is a plan view of the removable face pack.
Figure 3:
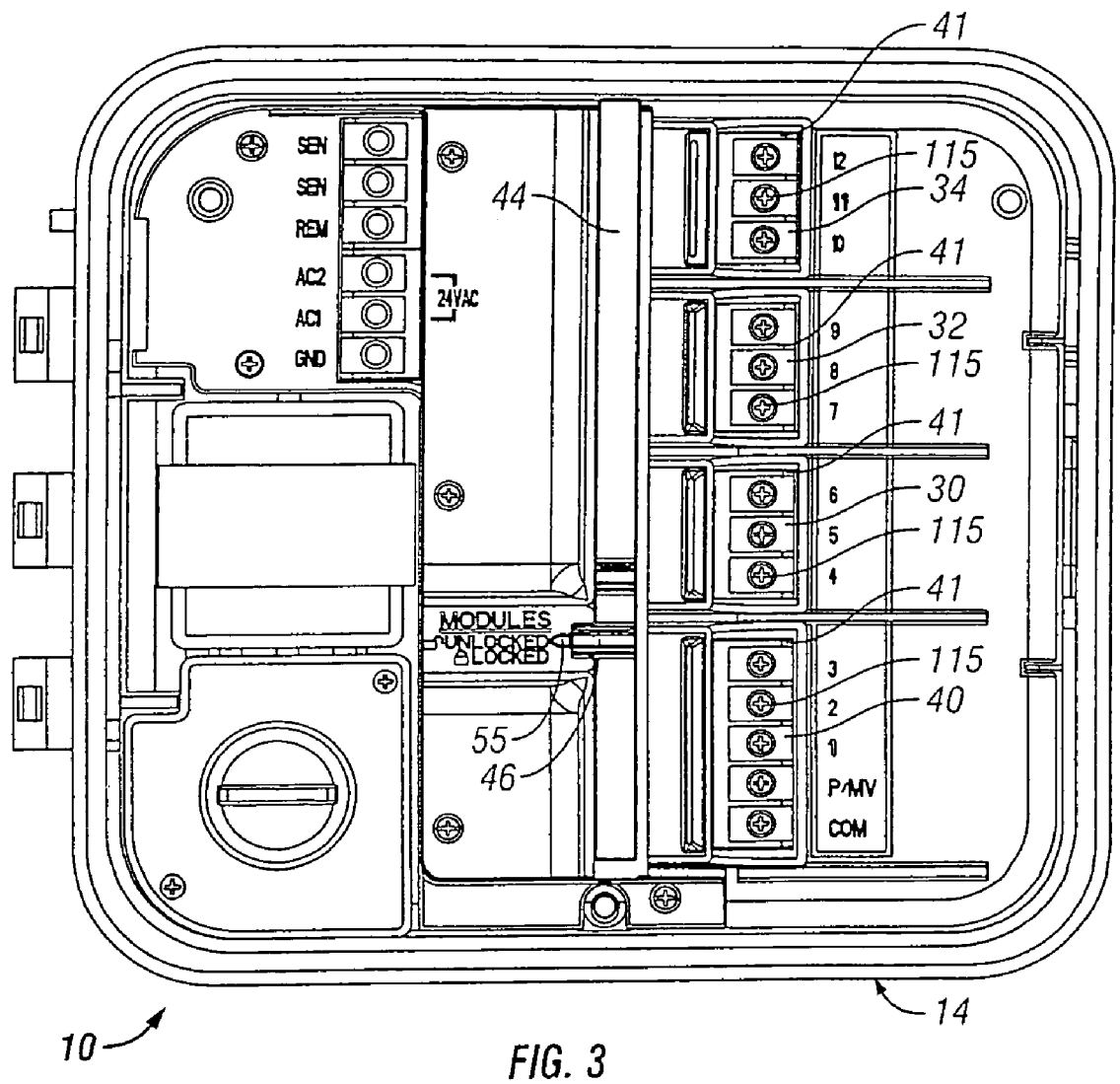
FIG. 3 is an enlarged plan view of the components of the irrigation controller of FIGS. 1 and 2 that are mounted in its back panel, which are accessible after the face pack has been removed.

Referring to FIGS. 1 and 2, an irrigation controller 10 in accordance with my invention comprises a wall-mounted structure including a generally box-shaped front door 12 hinged along its right vertical edge to a generally box-shaped back panel 14 (FIG. 3). A generally rectangular face pack 16 (FIG. 2) is removably mounted over the back panel 14 and is normally concealed by the front door 12 when not being accessed for programming. The face pack 16 has a plurality of manually actuable controls including a rotary dial switch 18 and push button switches 19, 20, 21 22, 23, 24 and 25 as well as slide switch 26, which can be manipulated in conjunction with numbers, words or graphic symbols indicated on a liquid crystal display 28 for entering or selecting a watering program as is well known in the art of electronic irrigation controllers. Custom watering programs can be created by the user by manipulating the rotary dial switch 18 and selected ones of the push button switches 19, 20, 21 22, 23, 24 and 25. Alternatively, existing pre-programmed watering programs can be selected, such as watering all zones every other day for five minutes per zone.

The face pack 16 (FIGS. 1 and 2) supports a main circuit board assembly with a processor for executing and implementing a stored watering program. An electrical connection is made between the face pack 16 and the components in the back panel 14 through a ribbon cable (not illustrated). The circuitry inside the face pack 16 can be powered by a battery to allow a person to remove the face pack 16, unplug the ribbon cable, and walk around the lawn, garden area or golf course while entering a watering program or altering a pre-existing watering program. The stored watering program can be a complex set of run time and cycle programs, or a portion thereof, such as a simple five minute cycle routine for a single station.

Referring to FIG. 3, female electrical connectors (not illustrated) in the ends of three box-like intelligent station modules 30, 32 and 34 receive corresponding male card edge connectors (not illustrated) with mating electrical contacts. The intelligent station modules 30, 32 and 34 are received in side-by-side fashion in a bay formed in the back panel 14 (FIG. 3) which is separate from the face pack 16 that encloses the processor. A larger, fourth box-like master module 40 plugs into the bay onto its own wider card edge connector and interfaces with a pump and sensor (not illustrated).

A locking slide bar 44 (FIG. 3) with a V-shaped gripping member 46 extends above the bay and may be slid up and down in FIG. 3 between an unlocked position and a locked position. Projections (not illustrated) on the underside of the slide bar 44 engage and disengage with projections (not illustrated) on the top surfaces of the modules to achieve the locked and unlocked states. A pointed tab 55 extending from the gripping member 46 alternately points to UNLOCKED and LOCKED indicia molded into the adjacent back panel structure to indicate the module connection status to the user. The positive module locking mechanism guards against partial or incomplete insertion of a module that could lead to open connections or shorts that would make a station or zone inoperable. The user is given visual and tactile feedback indicating that a positive lock has been established in the sense that each module has been fully inserted. The plurality of modules 30, 32, 34 and 40 are simultaneously locked and unlocked with respect to their respective receptacles, which in the embodiment illustrated in FIG. 3, are formed by side by side sections or regions of the bay formed in the back panel 14.

As used herein, the term "receptacle" refers to any structure and/or slot, region, area or section of any part of an irrigation controller frame or housing intended to receive and mechanically support, either internally or externally, a module and allow electrical contact and/or wireless connection between circuitry within the module and circuitry in the remainder of the controller. In the irrigation controller 10, each of the receptacles is defined by short sidewalls that divide a rear support wall of the rectangular bay in the back panel 14 and includes the associated male card edge connectors.

The back panel 14 (FIG. 3) is an outwardly opening plastic box that provides a support and a protective enclosure for removably receiving the modules 30, 32, 34 and 40. The back panel 14 is typically installed on a vertical wall of a building structure so that the modules, such as 30 are plugged in and removed in a horizontal direction, lateral relative to the user. In other words, the back panel 14 is oriented so that the modules are in a vertical column with the module 34 on top and the module 40 on the bottom. This prevents the weight of the modules from tending to unplug the same as might occur if the back panel 14 were mounted by rotating it ninety degrees clockwise from the orientation illustrated in FIG. 3.

The stripped ends of the wires that lead to the stations, a pump start relay or a sensor are secured to conventional screw terminals 115 (FIG. 3) of the modules 30, 32, 34 and 40. The screw terminals 115 are separated by upstanding plastic divider walls 41 to prevent contact between adjacent wires. The valves may be of the type disclosed in U.S. Pat. No. 5,996,608 granted Dec. 7, 1999 of Richard E. Hunter et al. entitled DIAPHRAGM VALVE WITH FILTER SCREEN AND MOVABLE WIPER ELEMENT, Inc.; U.S. Pat. No. 6,079,437 granted Jun. 27, 2000 to Mathew G. Beutler et al. entitled DIAPHRAGM VALVE WITH FLOW CONTROL STEM AIR BLEED; or U.S. Pat. No. 5,979,482 granted Nov. 9, 1999 of Loren W. Scott entitled REMOVABLE CAPTIVE PLUNGER WITH CONTAMINATION PROTECTION, all assigned to Hunter Industries, Inc., the entire disclosures of which are hereby incorporated by reference.

The term "solenoid actuated valve" as used herein shall also encompass valves used in irrigation systems in which a pilot valve is not directly opened and closed by a solenoid. These include hydraulically or pneumatically actuated valves which have a solenoid or its electrical equivalent somewhere in the fluid system, and not necessarily next to the gating valve, for controlling the fluid pressure to open and close the valves.

Figure 4:
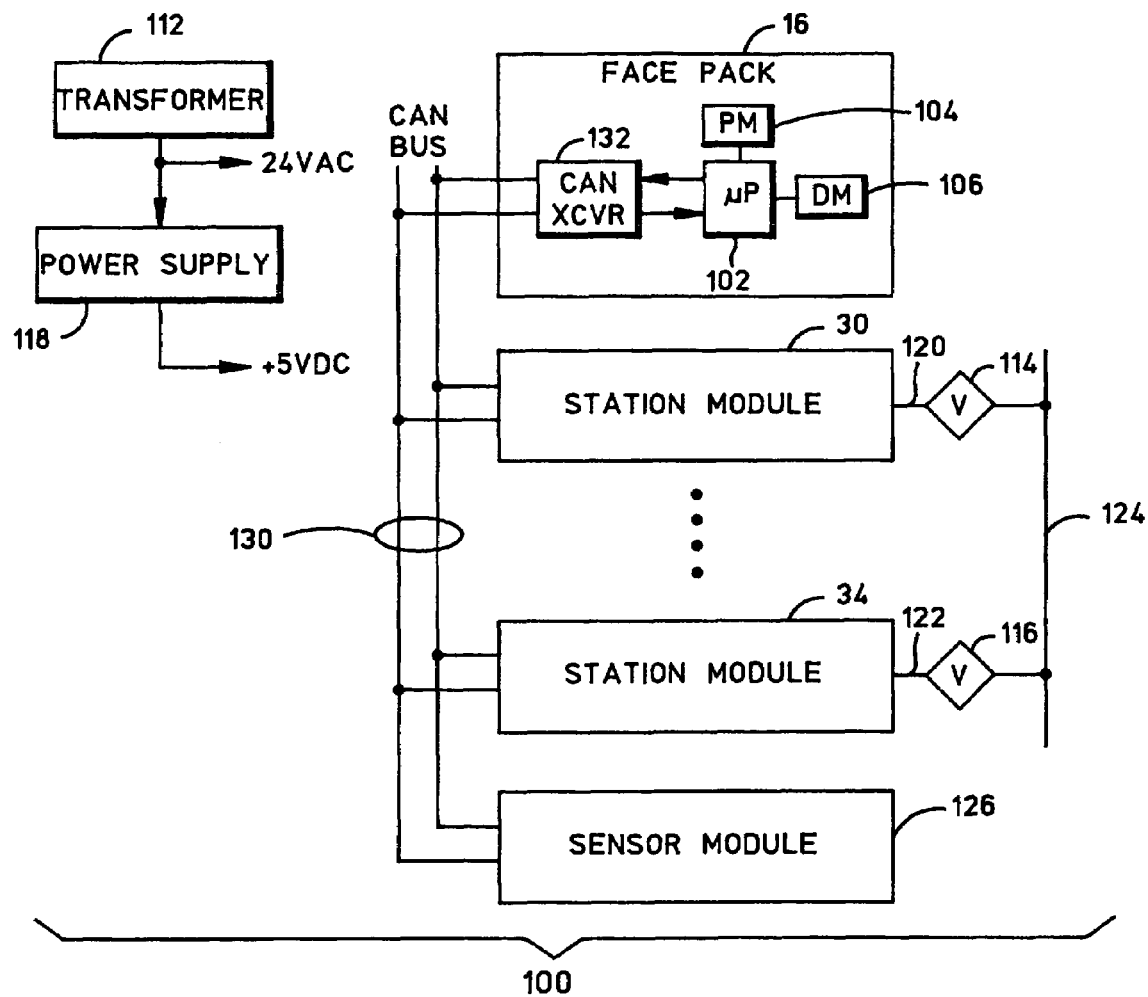
FIG. 4 is a block diagram of a distributed architecture irrigation controller that may utilize the electro-mechanical configuration illustrated in FIGS. 1-3.

FIG. 4 is a block diagram of a distributed architecture irrigation controller 100 that may utilize the electro-mechanical configuration illustrated in FIGS. 1-3. A processor 102 mounted in the face pack 16 executes a selected watering program stored in a program memory (PM) 104 using a data memory (DM) 106. See U.S. Pat. No. 5,444,611 granted Aug. 22, 1995 to Peter J. Woytowitz et al. entitled LAWN AND GARDEN IRRIGATION CONTROLLER, also assigned to Hunter Industries, Inc., the entire disclosure of which is hereby incorporated by reference. The program memory 104 may be provided as a read only memory (ROM), a flash memory, or other suitable permanent or semi-permanent micro-electronic memory. The data memory 106 is preferably a random access memory (RAM). The processor 102 may comprise a microprocessor that uses separate memory, or a micro-computer with on-chip memory that serves the same functions as the program memory 104 and data memory 106. The manually actuable controls and the display of the controller 10 are not illustrated in FIG. 4 for the sake of simplicity. They are interfaced with the processor 102 in the usual fashion. The processor 102 is operatively coupled through the ribbon cable to the male card edge connectors in each of the receptacles in the back panel 14 (FIG. 3).

The processor 102 (FIG. 4) controls the removable modules 30, 32, 34 and/or 40. Serial or multiplexed communication is enabled over a bus (hereafter described) so that all of the information as to which stations or zones should be turned ON and OFF at any given time is present at each receptacle. A twenty-four volt AC power signal from a transformer 112 plugged into a one-hundred ten volt AC wall outlet is supplied to each of the modules through a backplane 134 (FIGS. 5 and 6) connected to the male card edge connectors of each of the receptacles. The twenty-four volt AC power is used by the modules 30, 32 and 34 for switching solenoid actuated valves such as 114 and 116 ON and OFF. In FIG. 4 the valves 114 and 116 are denoted as diamonds with the letter "V" in the middle. The twenty-four volt AC power signal from the transformer 112 is also used by the master module 40 (FIG. 3) to control a pump or master valve (not illustrated). DC power is supplied by a power supply 118 to the face pack 16 via lines that extend within the ribbon cable.

A suitable electrical port (not illustrated) may be connected to the processor 102 for downloading a watering program that has been created on a personal computer and downloaded into a smart card, portable data shuttle or other removable media. See for example U.S. Pat. No. 6,088,621 granted Jul. 11, 2000 of Peter J. Woytowitz et al. entitled PORTABLE APPARATUS FOR RAPID RE-PROGRAMMING OF IRRIGATION CONTROLLERS, also assigned to Hunter Industries, Inc., the entire disclosure of which is hereby incorporated by reference. Alternatively, the processor 102 could receive programming and/or commands from a master computer via hard-wired or wireless connection. The programming executed by the processor 102 can include a cleaning cycle which momentarily turns on each valve after completion of a run cycle to flush debris away from the valve seat. See U.S. Pat. No. 5,829,678 granted Nov. 3, 1998 of Richard E. Hunter et al. entitled SELF-CLEANING IRRIGATION REGULATOR VALVE APPARATUS, also assigned to Hunter Industries, Inc., the entire disclosure of which is hereby incorporated by reference.

The intelligent station modules 30, 32 and 34 (FIG. 3) are configured for insertion into corresponding receptacles in the back panel 14. The intelligent station modules 30, 32 and 34 are connectable to solenoid actuated valves such as 114 and 116 (FIG. 4) through dedicated field valve lines such as 120 and 122. The valves 114 and 116 are connected to a common return line 124. Typically these lines comprise insulated twelve gauge wires whose stripped ends are secured to the screw terminals 115 (FIG. 3) of the modules 30, 32 and 34. Typically the valves 114 and 116 are mounted in subterranean boxes relatively close to the controller 10, i.e. within one hundred feet of the controller 10. Thus the intelligent station modules 30, 32 and 34 are used for controlling valves such as 114 and 116, it being understood that each module typically controls several such valves which, along with their associated sprinklers, comprise stations. The valves 114 and 116 control the supply of pressurized water through subterranean PVC pipes (not illustrated) equipped with risers and sprinklers. The intelligent station modules 30, 32 and 34 each include a micro-controller (hereafter described) and at least one switching device, such as a triac, for selectively supplying the twenty four volt AC power signal from the transformer 112 that energizes the corresponding solenoid actuated valve. In the example shown, the intelligent station modules 30, 32 and 34 each include three switching devices and can independently control three separate valves or stations. Suitable synchronous serial data and asynchronous serial data station module circuits are disclosed in the aforementioned U.S. Pat. No. 6,721,630 B1. A sensor module 126 (FIG. 4) may also be plugged into one of the receptacles. It off-loads many of the sensor monitoring tasks that would otherwise be performed by the processor 102 as described hereafter in greater detail.

A controller area network (CAN) bus 130 (FIG. 4) connects the processor 102 and the receptacles. The processor 102 is connected to the CAN bus 130 via a CAN transceiver (XCVR) 132. The processor 102 and the micro-controllers in the modules 30, 32, 34 and 126 each include means for bi-directionally sending and receiving messages over the CAN bus 130 that are generated by the processor 102 and the micro-controllers. The physical part of the CAN bus 130 is preferably a set of conductive traces that form part of the backplane 134 (FIGS. 5 and 6) of the controller 10 that includes the card edge connectors for the modules 30, 32, 34, 40 and 126. CAN bus signals (CANH and CANL), 24 volt AC power, five volt DC power and an unregulated DC voltage signal VRAW are carried on the backplane 134. In addition, the backplane 134 incorporates slot sense resistors (not illustrated) which are used by the modules to determine which slot they are plugged into. The CAN transceiver 132 transitions two logic signals from the micro-controllers in the modules (CAN transmit and CAN receive) to levels compatible with the CAN bus 130.

The open-ended distributed intelligence architecture of the CAN bus 130 allows bi-directional communication between various intelligent nodes and the main processor 102. The CAN bus 130 utilizes a message based communications protocol, as opposed to an address based communications protocol. This allows the main processor 102 or any intelligent node, such as the station modules 30, 32 and 34 or the sensor module 126, to send a message on the CAN bus 130 at any time. Each message contains an instruction in an identification field that describes the meaning of the message. The main processor 102 and other intelligent nodes decide for themselves whether or not the message is of importance to them based on the nature of the instruction, and if so, perform predetermined functions in response thereto. Bus collisions and arbitration are automatically handled by a CAN engine stored in the micro-controller of each intelligent node and in the program memory 104 utilized by the main processor 102.

Figure 5:
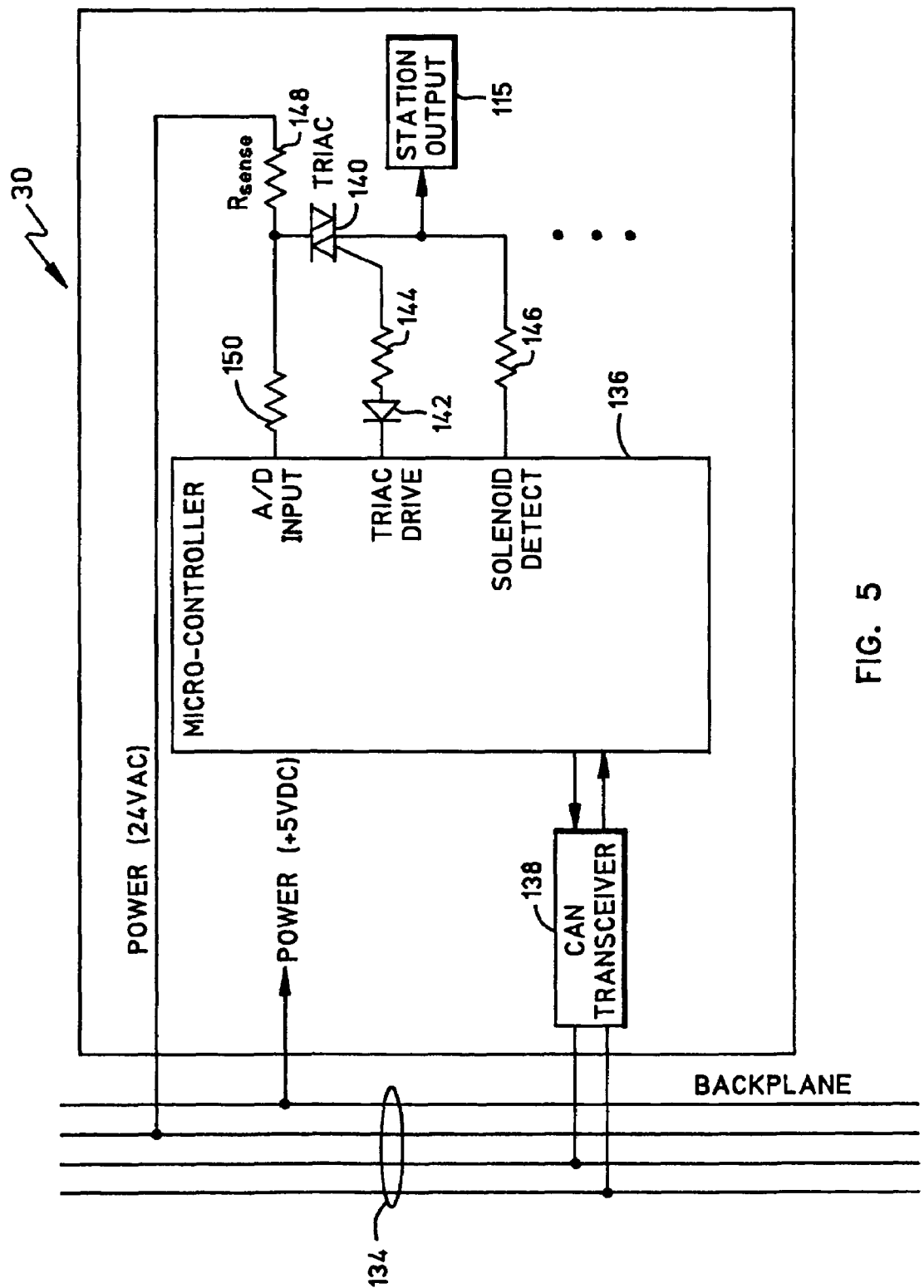
FIG. 5 is a block diagram of an exemplary intelligent station module of the irrigation controller of FIG. 4.

FIG. 5 is a block diagram of the intelligent station module 30 of the irrigation controller of FIG. 4. It will be understood that the station modules 30, 32 and 34 all have identical circuitry. A micro-controller 136 communicates with the processor 102 and the other modules via a CAN transceiver 138 connected to the conductive traces of the CAN bus 130 that are incorporated into the backplane 134. Other conductive traces in the backplane 134 deliver twenty-four volt AC and five volt DC power to the station module 30. The micro-controller 136 can switch the twenty-four volt AC power ON when the appropriate instruction is received. The switching of AC power is performed by a triac 140 which is controlled through diode 142 and resistor 144 connected to a triac drive output port of the micro-controller 136. The AC signal is applied to a station output connector in the form of screw terminal 115. The micro-controller 136 senses the connection of valve 114 via a resistor 146 connected to a solenoid detection port. As indicated by the three dots in FIG. 5, the station module 130 has at least three triacs and three station output screw terminals. The twenty-four volt AC signal is connected through a current sense resistor 148 labeled Rsense in FIG. 5 to the triac 140. Another resistor 150 connects the junction of the current sense resistor 148 and the triac 140 to an A/D port of the micro-controller 136.

In addition to switching ON and OFF the solenoid actuated valves that are connected to it, the micro-controller 136 of the station module 30 preferably handles one or more of the following functions:

1) monitoring the output current of each station that is switched ON and reporting it to the main processor 102 in the face pack 16;
2) monitoring station outputs for over-current incidents and effectuating immediate station shut down, and causing the face pack 16 to display a fault message;
3) determining whether a solenoid is connected to a particular station, or if one is attached but has failed in an open state by performing a solenoid diagnostic routine;
4) automatically re-trying a solenoid that has initially failed to activate, and causing an error message to be displayed if the re-try is unsuccessful;
5) employing a fail-safe time-out so that if communication from the face pack 16 is lost, each station will turn OFF after a predetermined time period has elapsed;
6) loading and counting down actual run times, and turning stations OFF upon completion of run time as opposed to waiting for an OFF command from the main processor 102; and
7) re-programming based on new application (i.e. executable) software loaded into the face pack 16, e.g. by having its firmware re-flashed from the face pack 16 to allow seamless output module firmware upgrades in the field.

Figure 6:
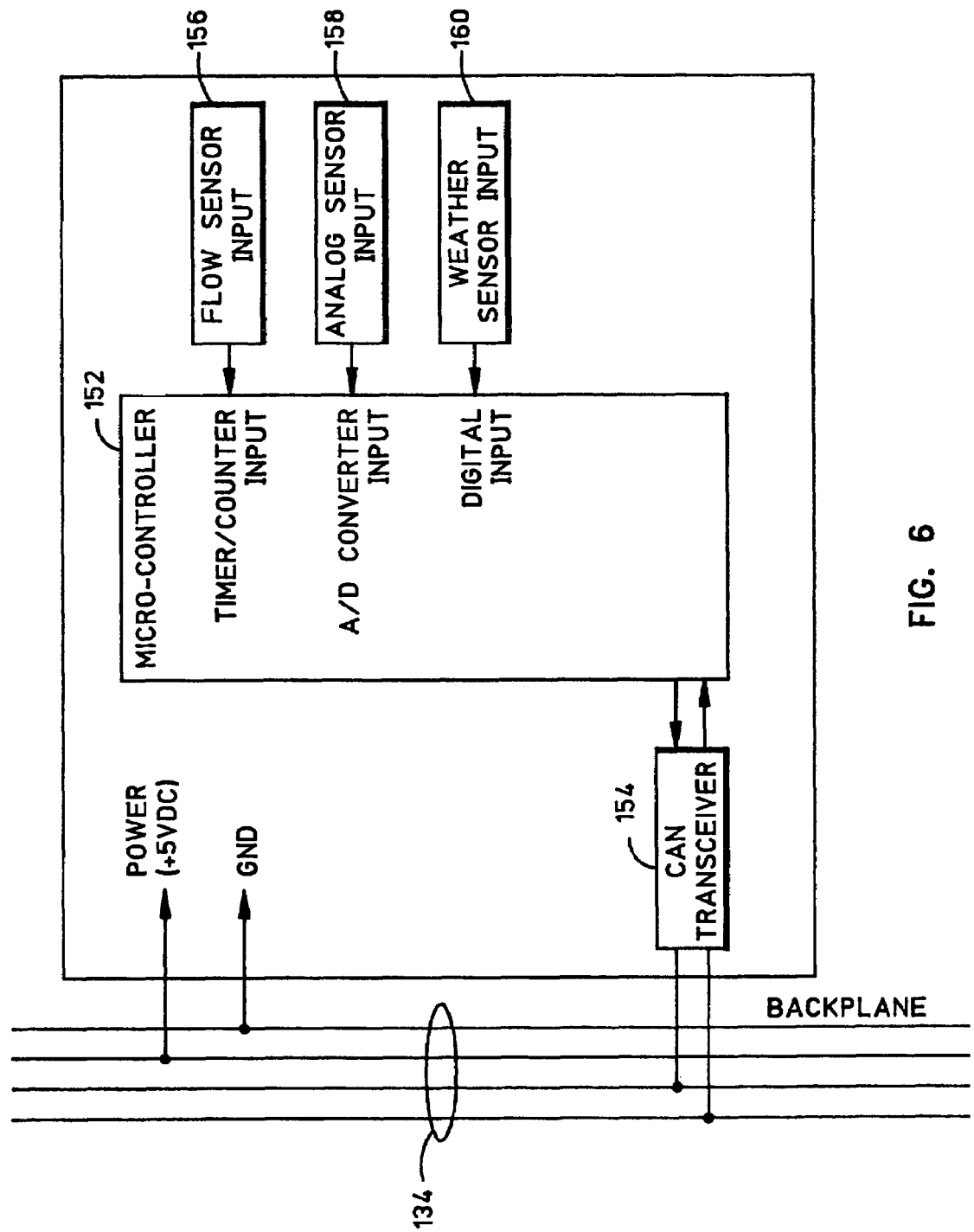
FIG. 6 is a block diagram of an exemplary intelligent sensor module of the irrigation controller of FIG. 4.

FIG. 6 is a block diagram of an exemplary intelligent sensor module 126 of the irrigation controller of FIG. 4. The sensor module includes a micro-controller 152 that is connected through a CAN transceiver 154 to the conductive traces of the CAN bus 130 that are incorporated into the backplane 134. Other conductive traces in the backplane 134 provide five volt DC power and ground connections to the sensor module 126. Input terminals 156, 158 and 160 may be connected to a flow sensor, analog sensor and weather sensor, respectively. One example of a weather sensor is a rain sensor used to interrupt the watering program. See for example U.S. Pat. No. 6,570,109 granted May 27, 2003 to Paul A. Klinefelter et al. entitled QUICK SHUT-OFF EXTENDED RANGE HYGROSCOPIC RAIN SENSOR FOR IRRIGATION SYSTEMS, also assigned to Hunter Industries, Inc., the entire disclosure of which is hereby incorporated by reference. See also U.S. Pat. No. 6,158,278 granted Dec. 12, 2000 to Paul A. Klinefelter entitled WIND SPEED DETECTOR ACTUATOR, also assigned to Hunter Industries, Inc., the entire disclosure of which is hereby incorporated by reference. See also pending U.S. patent application Ser. No. 10/977,918 filed Oct. 29, 2004, in the name of Peter J. Woytowitz entitled MOISTURE ABSORPTIVE RAIN SENSOR WITH SEALED POSITION SENSING ELEMENT FOR IRRIGATION WATERING PROGRAM INTERRUPT, also assigned to Hunter Industries, Inc., the entire disclosure of which is hereby incorporated by reference.

The sensor module 126 (FIG. 6) off-loads to the micro-controller 152 many of the sensor monitoring tasks that would otherwise be performed by the processor 102. These tasks include, but are not limited to:

1) monitoring multiple sensor inputs, combining data, and transmitting the data back to the main processor 102 in the face pack 16 in summary fashion;
2) providing de-bounce and low-pass filtering functions for sensor inputs;
3) providing rate counting and filtering functions for flow sensor inputs;
4) providing an integration (totalizing) function for flow sensor inputs; and
5) providing an analog-to-digital conversion function for analog inputs.

Thus the distributed architecture of the controller 10 off loads many of the tasks previously performed by the main processor 102 to the micro-controllers 136 and 152 of the station and sensor modules. This allows more of the processing bandwidth of the main processor 102 to be used for user interface functions and scheduling tasks, thus allowing more complex schedules and greater overall flexibility. For example, the main processor 102 may be able to use both historical and actual evapotranspiration data to alter its watering schedules, as disclosed in the aforementioned pending U.S. patent application Ser. No. 10/985,425 filed Nov. 9, 2004 naming LaMonte D. Porter et al. as co-inventors and entitled EVAPOTRANSPIRATION UNIT CONNECTABLE TO AN IRRIGATION CONTROLLER. The distributed architecture of the controller 10 has the advantage of being "open-ended" in the sense that as more functions are developed, new intelligent modules can be designed and connected to the CAN bus 130 by insertion into a receptacle, thereby placing the new intelligent modules in communication with the main processor 102 and all of the already-installed station and sensor modules.

Figure 7:
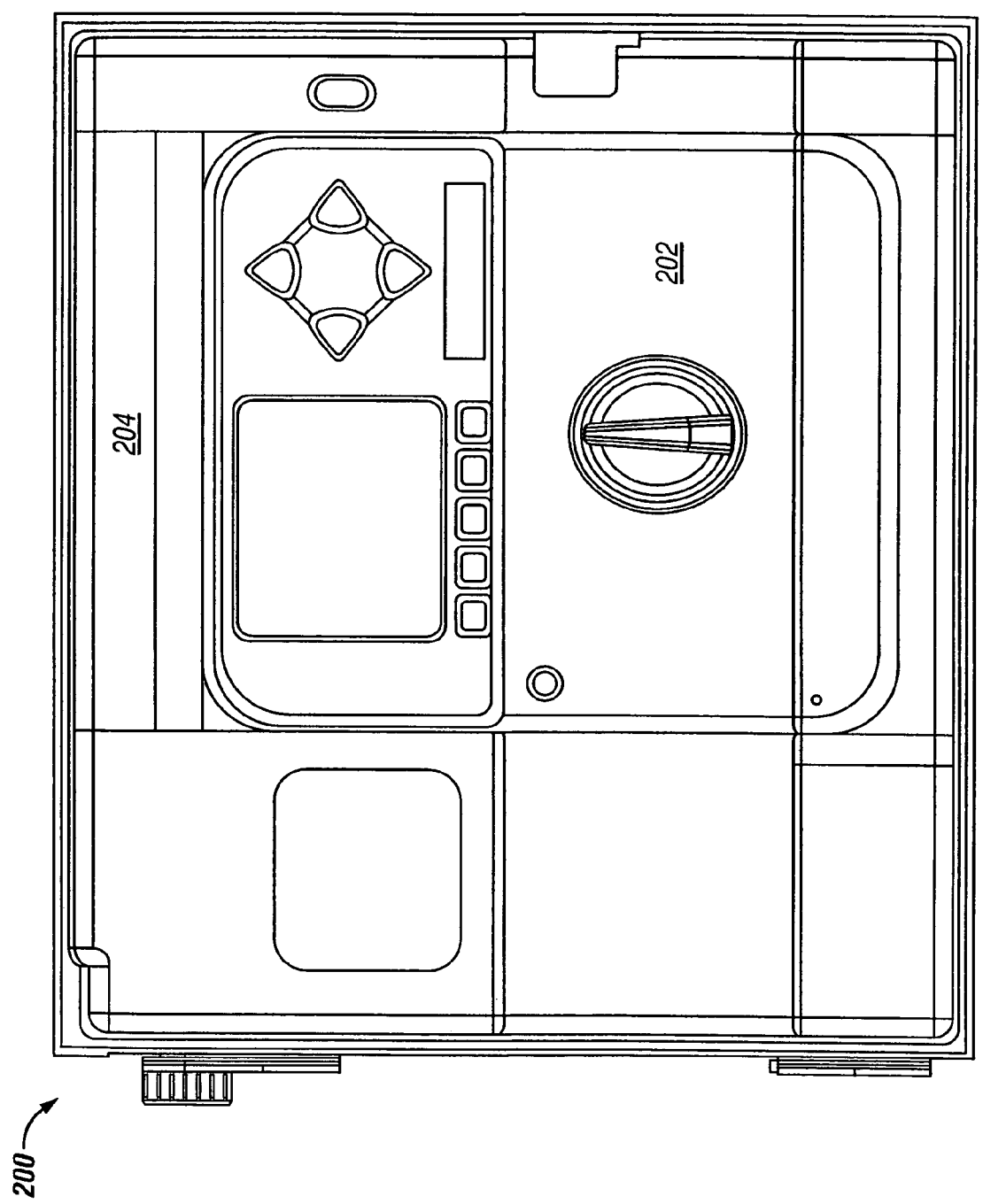
FIG. 7 is a plan view of an alternate embodiment of the irrigation controller with its front door removed.
Figure 8:
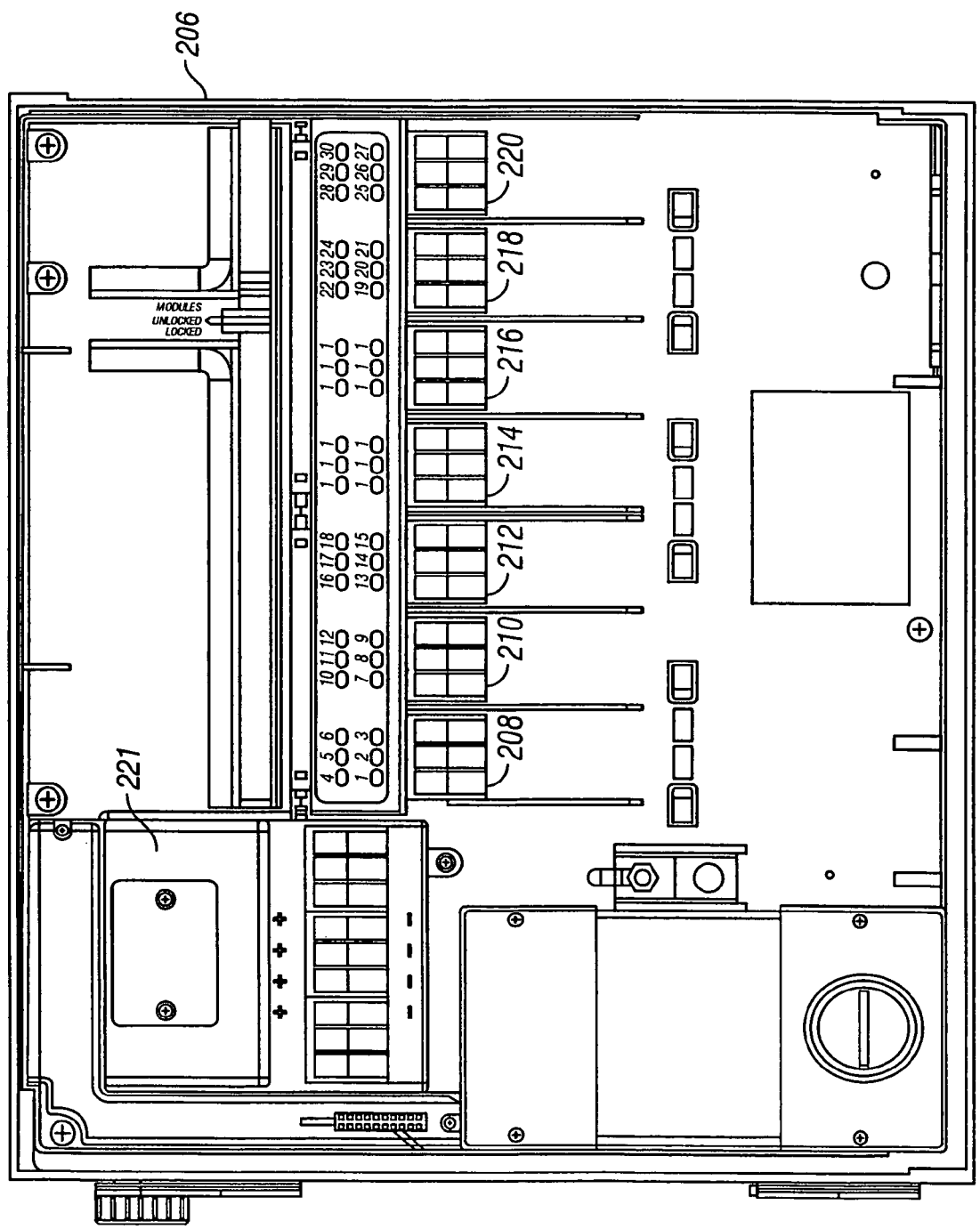
FIG. 8 is a plan view of the back panel of the alternate embodiment of FIG. 7 illustrating seven station modules and a master module installed.
Figure 9:
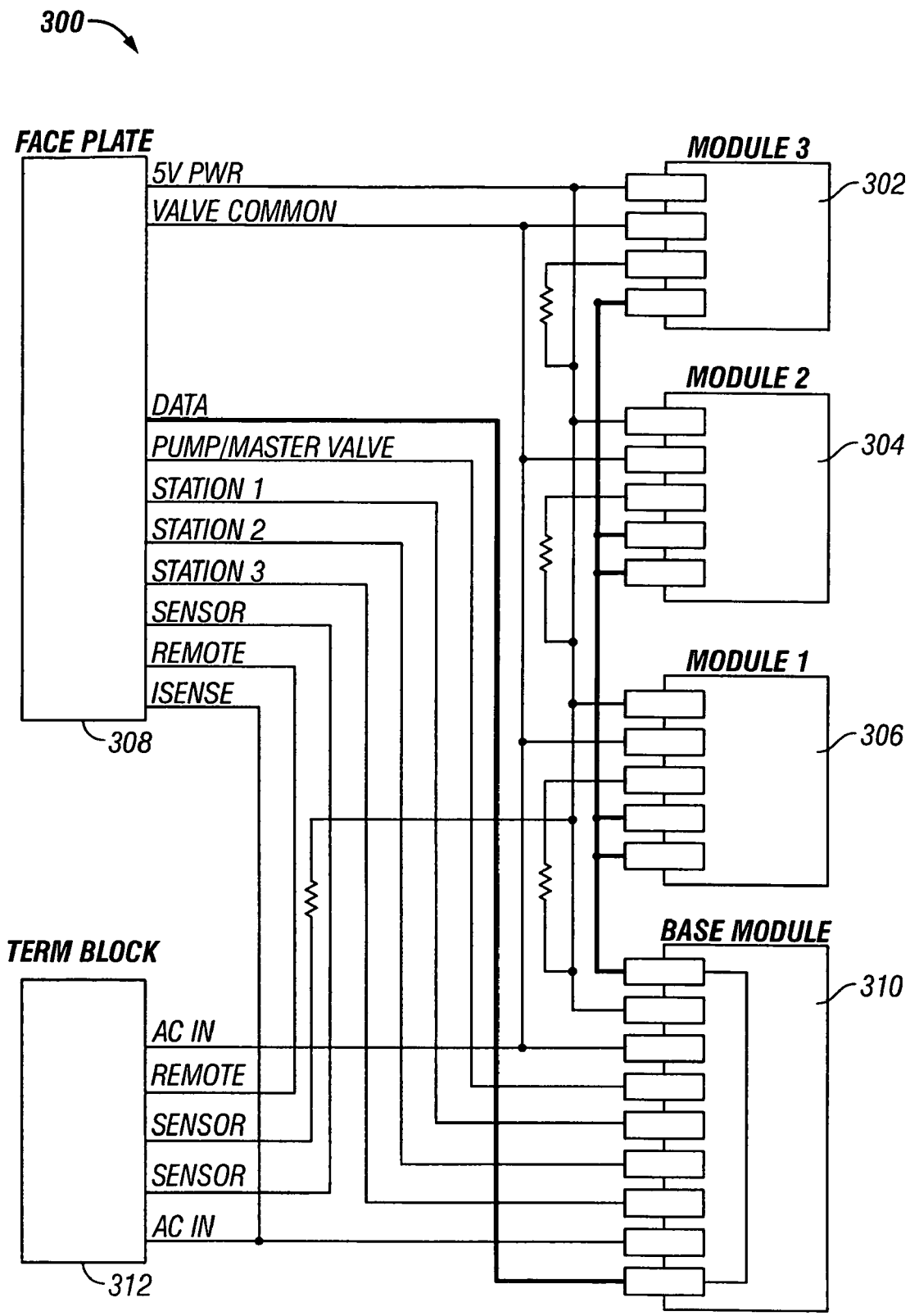
FIG. 9 is a block diagram of another alternate embodiment in which the station modules indirectly communicate with the processor through the base module.

Referring to FIG. 7, an alternate embodiment of the irrigation controller 200 has a face pack 202 that removably mounts within a generally rectangular frame 204. The frame 204 swings open and can be removed from the box-like back panel 206. The electrical connection between the face pack 202 and the frame 204 is made utilizing a db9 connector (not visible) at the bottom of the face pack 202. Referring to FIG. 8, seven station modules 208, 210, 212, 214, 216, 218 and 220 are shown plugged into corresponding receptacles. A master module 222 is installed in the upper left corner of the back panel 206. FIG. 9 is a block diagram of another alternative embodiment 300 in which the station modules 302, 304 and 306 indirectly communicate with the processor in the face plate 308 through the base module 310. A terminal block 312 is connected to the face plate 308 and to the modules 302, 304, 306 and 310, as illustrated. Thus the alternate embodiment 300 illustrated in FIG. 9 provides a daisy chain communications scheme within the controller back plane through the base module 310.

While I have described an embodiment of my distributed architecture irrigation controller, it will be apparent to those skilled in the art that my invention can be modified in both arrangement and detail. My invention could be adapted to a wide variety of other irrigation controller configurations, such as the ICC controller manufactured and sold by Hunter Industries, Inc., disclosed in FIGS. 1-3 of pending U.S. patent application Ser. No. 10/430,929 filed May 5, 2003 of Mathew G. Beutler et al. entitled POSITIVE STATION MODULE LOCKING MECHANISM FOR EXPANDABLE IRRIGATION CONTROLLER, the entire disclosure of which is hereby incorporated by reference. Said application is also assigned to Hunter Industries, Inc. Moreover, it is possible to construct an irrigation controller in accordance with the teachings of the present invention that has many more receptacles, mounts the modules externally, or does not have removable modules at all. The conductive traces on the backplane and on the card edge connectors can be configured so that the modules are indirectly connected to the main processor, one through the other, in a daisy chain architecture. Therefore the protection afforded my invention should only be limited in accordance with the scope of the following claims.

I claim:

1. A distributed architecture irrigation controller, comprising:
    means for entry or selection of a watering program;
    means for storing the watering program;
    means for providing a plurality of receptacles for removably receiving a plurality of modules;
    a plurality of station modules each configured for insertion into one of the receptacles and connectable to a corresponding solenoid actuated valve, each station module including a micro-controller and at least one switching device for selectively providing a power signal that energizes the corresponding solenoid actuated valve;
    processor means for executing the stored watering program and controlling the station modules in accordance with the stored watering program;
    a controller area network (CAN) bus connecting the processor means and the receptacles; and
    the processor means and the micro-controllers each including means for sending and receiving messages over the bus that are generated by the processor means and the micro-controllers.

2. The controller of claim 1 wherein each message contains an identification field with an instruction that describes a meaning of the message, and the processor means and the micro-controllers are each capable of interpreting the message received thereby and performing a predetermined function in response thereto.

3. The controller of claim 2 wherein the micro-controllers are capable of performing one or more functions selected from the group consisting of turning a corresponding switching device ON and OFF, monitoring an output current of a corresponding solenoid actuated valve, and turning a switching device OFF upon detection of an over-current event.

4. The controller of claim 1 and further comprising at least one sensor module configured for insertion into one of the receptacles and connectable to at least one sensor, each sensor module including a second micro-controller.

5. The controller of claim 4 wherein the second micro-controller includes means for sending and receiving messages over the bus.

6. The controller of claim 5 wherein each message sent by the processor means and the micro-controllers contains an identification field which describes a meaning of the message, and the processor means and the micro-controllers are each capable of interpreting the message received thereby and performing a predetermined function in response thereto.

7. The controller of claim 6 wherein the second micro-controller is capable of performing one or more functions selected from the group consisting of monitoring a plurality of sensor outputs, providing de-bounce filtering, providing low-pass filtering, providing rate counting, totalizing a plurality of sensor outputs, and analog-to-digital conversion.

8. The controller of claim 1 wherein the controller further comprises a back panel in which the receptacles are located.

9. The controller of claim 8 wherein the controller further comprises a face pack removably mounted over the back panel and supporting a circuit board on which the processor means is mounted.

10. A distributed architecture irrigation controller, comprising:
- a plurality of manually actuable controls for entry or selection of a watering program;
- a memory for storing the watering program;
- a plurality of receptacles for removably receiving a plurality of modules;
- a plurality of station modules each configured for insertion into one of the receptacles and connectable to a corresponding solenoid actuated valve, each station module including a micro-controller and at least one switching device for selectively providing a power signal that energizes the corresponding solenoid actuated valve;
- a microprocessor that executes the stored watering program and controls the station modules in accordance with the stored watering program;
- a controller area network (CAN) bus connecting the microprocessor and the receptacles; and
- the microprocessor and the micro-controllers being capable of sending and receiving messages over the bus that are generated by the microprocessor and the micro-controllers.

11. The controller of claim 10 wherein each message contains an identification field with an instruction that describes a meaning of the message, the microprocessor and the micro-controllers are each capable of interpreting the message received thereby and performing a predetermined function in response thereto.

12. The controller of claim 10 wherein the micro-controllers are capable of performing one or more functions selected from the group consisting of turning a corresponding switching device ON and OFF, monitoring an output current of a corresponding solenoid actuated valve, turning a switching device OFF upon detection of an over-current event, solenoid detection, and solenoid diagnostics.

13. The controller of claim 10 and further comprising at least one sensor module configured for insertion into one of the receptacles and connectable to at least one sensor, each sensor module including a second micro-controller.

14. The controller of claim 13 wherein the second micro-controller is capable of sending and receiving messages over the bus.

15. The controller of claim 13 wherein each message contains an identification field which describes a meaning of the message, the microprocessor and the micro-controllers are each capable of interpreting the message received thereby and performing a predetermined function in response thereto.

16. The controller of claim 15 wherein the second micro-controller is capable of performing one or more functions selected from the group consisting of monitoring a plurality of sensor outputs, providing de-bounce filtering, providing low-pass filtering, providing rate counting, totalizing a plurality of sensor outputs, and analog-to-digital conversion.

17. The controller of claim 10 and further comprising a back panel in which the receptacles are located.

18. A method of controlling a plurality of valves in an irrigation system, comprising the steps of:
- providing a plurality of valves;
- providing a processor connected by a controller area network (CAN) bus to a plurality of station modules, each station module being connected to a corresponding one of the valves and having a micro-controller, the processor executing a stored watering program and controlling the station modules in accordance with the program; and
- bi-directionally sending and receiving messages over the bus that are generated by the processor and the micro-controllers, each message containing an identification field with an instruction that describes a meaning of the message, the processor and the micro-controllers each interpreting the messages received thereby and performing predetermined functions in response thereto.

19. A method of upgrading programming in a distributed architecture irrigation controller, comprising the steps of:
- providing a main processor connected by a controller area network (CAN) bus to a plurality of station modules, each station module being connected to a corresponding valve and having a micro-controller;
- the main processor executing a watering program and controlling the station modules in accordance with the watering program;
- each micro-controller performing one or more functions based on its own application programming;
- loading application re-programming for the micro-controllers into the main processor; and
- uploading the application re-programming from the main processor to the micro-controllers through the bus.

* * * * *